(12) United States Patent  
Mizusawa

(10) Patent No.: US 9,160,043 B2  
(45) Date of Patent: Oct. 13, 2015

(54) DISASSEMBLING AND RECYCLING A BATTERY

(71) Applicant: EMPIRE TECHNOLOGY DEVELOPMENT LLC, Wilmington, DE (US)

(72) Inventor: Atsushi Mizusawa, Kyoto (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/083,279

(22) Filed: Nov. 18, 2013

(65) Prior Publication Data

US 2014/0068929 A1   Mar. 13, 2014

Related U.S. Application Data

(62) Division of application No. 13/000,421, filed as application No. PCT/US2010/048703 on Sep. 14, 2010, now Pat. No. 8,615,864.

(51) Int. Cl.
*H01M 10/54* (2006.01)
*H01M 10/052* (2010.01)

(52) U.S. Cl.
CPC ............ *H01M 10/54* (2013.01); *H01M 10/052* (2013.01); *Y02W 30/84* (2015.05); *Y10T 29/49726* (2015.01); *Y10T 29/49815* (2015.01); *Y10T 29/53278* (2015.01)

(58) Field of Classification Search
CPC ................ H01M 10/54; H01M 10/052; Y10T 29/49726; Y10T 29/49815; Y10T 29/53278; Y02W 30/84

USPC ............ 29/426.1, 426.2, 426.4, 426.5, 426.6, 29/700, 703, 801
See application file for complete search history.

(56) References Cited

U.S. PATENT DOCUMENTS

| | | | | |
|---|---|---|---|---|
| 3,152,504 A | * | 10/1964 | Brown ............................ | 83/419 |
| 5,303,872 A | * | 4/1994 | Milewits et al. ................ | 241/41 |
| 5,523,516 A | | 6/1996 | Berry et al. | |
| 5,778,503 A | | 7/1998 | Tsuchimoto et al. | |
| 5,882,811 A | | 3/1999 | Kawakami | |
| 6,329,096 B2 | | 12/2001 | Kawakami et al. | |
| 2001/0008723 A1 | | 7/2001 | Kawakami et al. | |
| 2008/0050295 A1 | | 2/2008 | Uchida et al. | |

(Continued)

FOREIGN PATENT DOCUMENTS

| | | |
|---|---|---|
| CN | 1170968 A | 1/1998 |
| EP | 0 452 564 A1 | 10/1991 |

(Continued)

OTHER PUBLICATIONS

International Search Report and Written Opinion for International Application No. PCT/US2010/048703 mailed on Nov. 9, 2010.

*Primary Examiner* — Carl Arbes
(74) *Attorney, Agent, or Firm* — Maschoff Brennan

(57) ABSTRACT

A disassembled battery and methods for disassembling the battery are provided. Holes are formed in an enclosure of the battery and a fluid is injected into the battery to inactivate an electrolyte inside the battery. The enclosure of the battery is then cut to define strips in the enclosure that can be peeled back to expose a core inside the battery. The core can be extracted and recycled.

15 Claims, 5 Drawing Sheets

(56) References Cited

U.S. PATENT DOCUMENTS

| | | |
|---|---|---|
| 2009/0286137 A1 | 11/2009 | Sloop |
| 2010/0310967 A1 | 12/2010 | Huang et al. |

FOREIGN PATENT DOCUMENTS

| | | |
|---|---|---|
| JP | 06-251805 A | 9/1994 |
| JP | 08-088029 A | 4/1996 |
| JP | 08-096859 A | 4/1996 |
| JP | 09-017461 A | 1/1997 |
| JP | 09-082369 A | 3/1997 |
| JP | 09-117748 A | 5/1997 |
| JP | 10-223264 A | 8/1998 |
| JP | 10-241748 A | 9/1998 |
| JP | 10-255861 A | 9/1998 |
| JP | 11-224698 A | 8/1999 |
| JP | 11-260426 A | 9/1999 |
| JP | 2000-235873 A | 8/2000 |
| JP | 2004-134325 A | 4/2004 |
| JP | 2006-073216 A | 3/2006 |
| JP | 2006-331707 A | 12/2006 |
| JP | 2009-054595 A | 3/2009 |
| WO | 2010/077982 A2 | 7/2010 |

* cited by examiner

DISASSEMBLING AND RECYCLING A BATTERY

CROSS-REFERENCE TO RELATED APPLICATION

This application is a divisional filing under 35 U.S.C. §121 of U.S. patent application Ser. No. 13/000,421, filed on Dec. 21, 2010, now U.S. Pat. No. 8,615,864, which is the U.S. National Stage filing under 35 U.S.C. §371 of PCT International Patent Application No. PCT/US2010/048703, filed Sep. 14, 2010. The foregoing applications are incorporated herein by reference.

BACKGROUND

Many of the electronic devices in use today rely on batteries to provide power. In fact, millions of batteries, including lithium-ion batteries, are produced every year. These types of batteries use materials that are being depleted. Lithium and cobalt, for instance, are examples of elements used in the manufacture of lithium-ion batteries. These batteries can be regarded as an untapped resource of these elements.

As a result, there have been attempts to recover these elements from discarded batteries. Unfortunately, conventional methods for disassembling these types of batteries carry substantial risk. The most serious problem is caused by short circuits that occur in the disassembly process. As a result, discarded batteries often form an untapped resource of these elements.

SUMMARY

Embodiments of the invention relate to batteries and more particularly to dissembling batteries. The disassembled batteries can be recycled to recover elements used in their manufacture. In one embodiment, a method for disassembling a battery includes forming holes in the battery. The battery includes an enclosure and a cover and the holes may be formed in an enclosure at a location where the hole accesses a clearance in the battery between the cover and the battery's core. After forming the holes, a fluid is injected into the battery to inactivate electrolyte included in the core of the battery. Then, some of the outer surface of the battery is cut and the core is removed from the enclosure of the battery.

In another embodiment, a system for disassembling a battery includes a support unit configured to support the battery during disassembly. The battery includes a core disposed inside an enclosure and sealed with a cover. Once the battery is secured, a drill component is used to form holes in the battery. An injection module then injects a fluid through the holes to inactivate an electrolyte inside the battery. A cutting unit is configured to cut an outer surface of the enclosure. The core can then be removed from within the enclosure.

The disassembled battery includes a cover and an enclosure. The enclosure has holes formed therein that are used to inject an inactivating fluid into a cavity of the battery that is configured to hold a core. Cuts are formed in the enclosure. The cuts create weak spots that enable strips defined by the cuts to be peeled away from the core to enable extraction of the core from the enclosure. The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings and components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Energy storage devices, such as lithium-ion batteries, are manufactured using various elements such as, by way of example only, lithium and cobalt. The ability to recover these elements, however, if often a dangerous and costly process. Embodiments of the invention relate to disassembling a battery. The disassembly of a battery may include recovering and/or recycling the materials or elements used in the manufacture of the battery.

Figure 1:
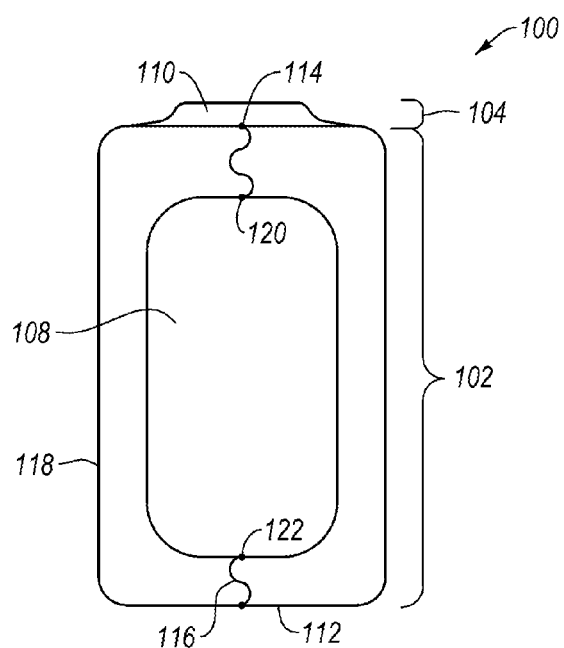
FIG. 1 shows an illustrative example of a battery.

FIG. 1 shows an illustrative example of a battery 100. The battery 100 includes an enclosure 102 connected with a cover 104. A core 108 (e.g., a wound sheet electrode) is typically included inside of the enclosure 102 and covered or sealed inside the enclosure 102 of the battery 100 by the cover 104. A body 118 of the enclosure 102 defines a cavity for receiving the core 108.

A positive electrode 120 is connected to a positive contact 110 by a positive contact wire 114. A negative electrode 122 is connected to a negative contact 112 by a negative contact wire 116.

The core 108 typically includes an anode, a cathode, and an electrolyte. Anodes are often formed from carbon and cathodes are often formed from lithium cobalt oxide, lithium iron phosphate, manganese oxide, and/or other materials well known in the art. The electrolyte typically includes some type of salt in a solvent (e.g., a lithium salt in an organic solvent).

Generally, the disassembly process includes eliminating the volatility of the organic solvent or other method to reduce or eliminate ion conductivity, for example, by solidifying the organic solvent. Once the ion conductivity is reduced or eliminated, the enclosure 102 is at least partially removed and the core 108 can be extracted. The core 108 can be processed to recover and/or recycle elements included in the core 108 such as lithium, cobalt, etc.

Figure 2:
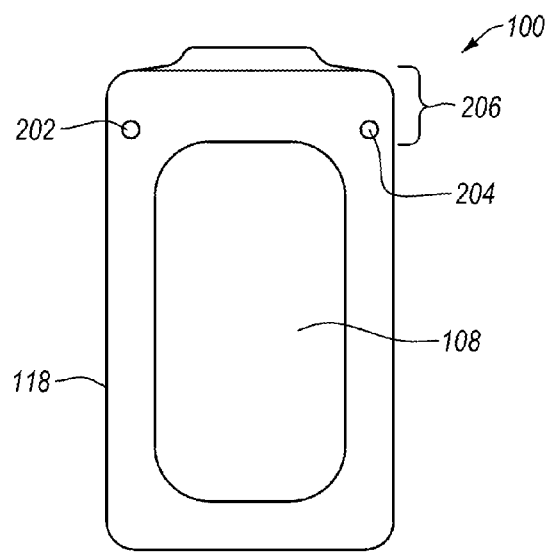
FIG. 2 shows an illustrative embodiment of a battery being prepared for disassembly.

FIG. 2 shows an illustrative embodiment of a battery being prepared for disassembly. FIG. 2 illustrates that the battery 100 includes a clearance 206 at a top of the enclosure 102. A top of the core 108 is below the clearance 206 in this example. FIG. 2 illustrates holes 202 and 204 that have been formed in the enclosure 102 by a drill component. In this example, the holes 202 and 204 are formed to access the clearance 206 above the core 108. More specifically, the holes 202 and 204 are formed to avoid or minimize contact with the core 108. Aligning the holes 202 and 204 with the clearance 206 ensures, for example, that the formation of the holes 202 and 204 avoids the electrolyte or other components of the core 108. For example, a drill bit used to form the holes 202 and 204 will extend into the clearance 206 and not into the core 108.

Although FIG. 2 illustrates a pair of holes 202 and 204, the number of holes formed in the enclosure 102 can be as few as one hole to more than two holes. The drill component may form the holes 202 and 204 by punching, drilling, etching, cutting, ablating, melting, or the like or any combination thereof. Thus, the drill component may use drill bits, lasers, flames, or the like to form the holes 202 and 204. In addition, the battery 100 is typically oriented such that any fluid inside the enclosure 102 is kept inside the enclosure 102 while forming the holes 202 and 204. In some instances, a cooling lubricant may be used while forming the holes 202 and 204 to reduce heat that may occur, for example, while drilling the holes 202 and 204. Providing a cooling lubricant keeps the battery 100 cool during disassembly or at a reasonably safe temperature.

Figure 3:
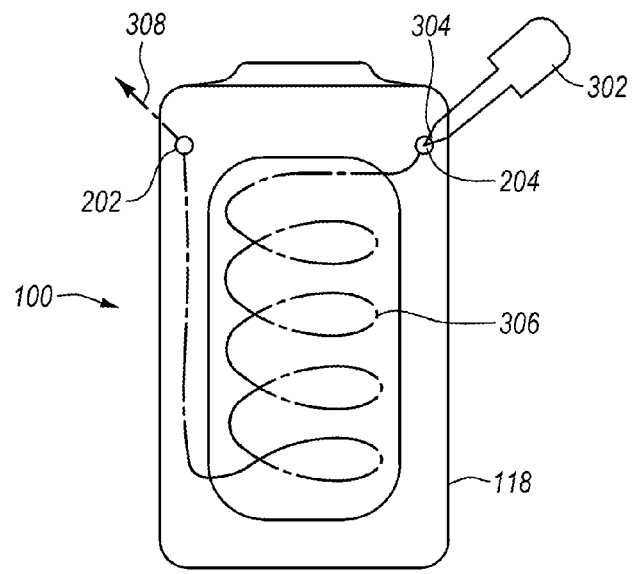
FIG. 3 shows an illustrative example of the battery while making the electrolyte non-volatile or less volatile during disassembly.

FIG. 3 shows an illustrative example of the battery while making the electrolyte non-volatile or less volatile during disassembly. Once the holes 202 and 204 are formed in the enclosure 102, an injection module 302 is used to inject a fluid 306 into the enclosure 102. The injection module 302 is typically placed against at least one of the holes, for example, the hole 204. A tip 304 (the injection module may include multiple tips that align with multiple holes) of the injection module 302 may be pressed into the hole 204 such that injected fluid 306 does not come out of the hole 204, but is directed to the cavity formed by the body 118. More specifically, the fluid 306 is injected in order to mix with at least the electrolyte in the core 108.

In addition, the tip 304 may be curved in order to determine a direction at which the fluid is injected inside the battery 100. For instance, the tip 304 may be curved or angled such that the fluid is directed towards an end of the battery 100 opposite the cover 104 once the tip 304 is properly inserted. In some instances, the tip 304 may be configured with a seal to press against the hole 204.

The fluid 306 injected into the battery 100 may include one or more of water, acrylic monomer, silicone oil, diglycidylether, diamine, or the like. The fluid 306 may also include combinations of different fluids such as, by way of example only, (i) water and acrylic monomer or (ii) silicone oil, diglycidylether, and diamine. In addition, multiple fluids may be injected in sequence or simultaneously.

The fluid 306, which is an example of an inactivating liquid, inactivates the electrolyte inside the battery 100. In one example, the fluid 306 inactivates the electrolyte by solidifying or at least partially solidifying the electrolyte. The fluid 306 makes the electrolyte non-volatile or at least less volatile.

As the fluid 306 is injected inside the battery 100, some fluid may be expelled from the hole 202. Expelled fluid 308 may be cycled and returned back to the battery 100 through the injection module 302. The solidified electrolyte remains inside the battery 100. Alternatively, the fluid 306 may be injected and the expelled fluid 308 is saved to be recycled at a later time. A path of the fluid 306 inside the battery 100 can depend on the shape of the electrodes, the placement of the tip 304, or the like. Over time, the injected fluid 306 circulates inside of the battery 100 to inactivate the electrolyte. Once the electrolyte is inactivated or solidified, the injection module 302 may be withdrawn.

Figure 4:
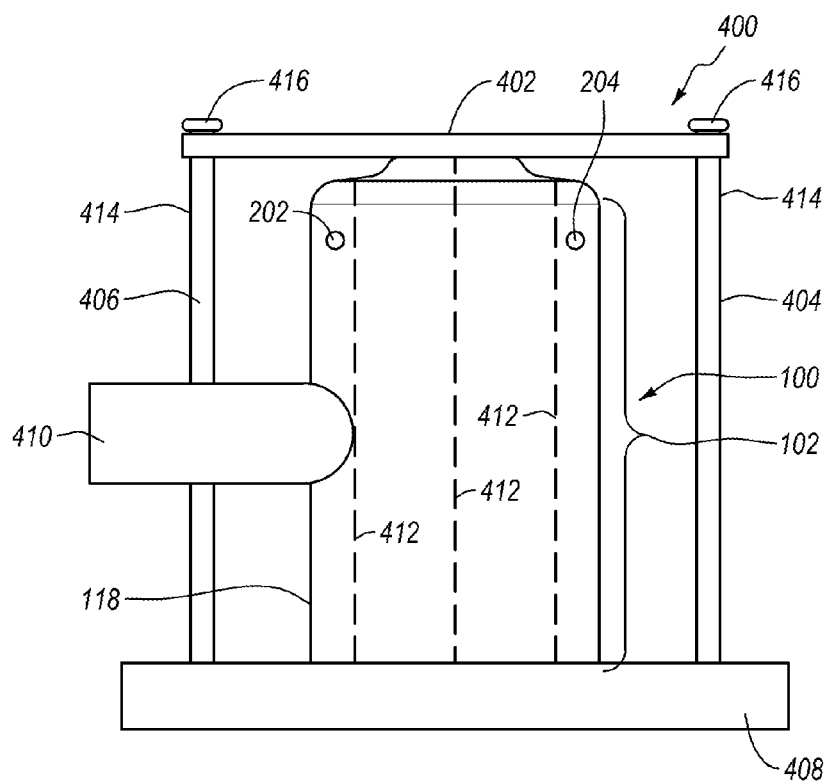
FIG. 4 shows an illustrative example of a battery that has been cut during disassembly.

FIG. 4 shows an illustrative example of a battery that has been cut during disassembly. After the electrolyte is solidified or inactivated, the enclosure 102 is cut or scored in preparation for removal. Before cutting the enclosure 102, the battery 100 is typically placed in a support unit 400. In fact, the battery may be placed in the support unit 400 for most of the disassembly process.

The support unit 400 includes support plates 402 and 408 and supports 404 and 406. In this example, the supports 404 and 406 are typically fixed permanently to the support plate 408. During disassembly, the battery 100 is placed on the support plate 408 and the support plate 402 is then placed on top of the battery 100. The support plate 402 typically includes holes to accommodate insertion of the supports 404 and 406 through the support plate 402. The supports 404 and 406, which may have threads on one end 414, can be secured using connectors 416 (e.g., bolts or caps). Tightening the connectors 416 secures the battery 100 in the support unit 400. In another example, the support plate 402 may be pressed down by pistons to secure the battery 100 rather than relying on the connectors 416.

Thus, the battery 100 is securely held by the support unit 400. In addition, the support unit 400 may additionally be mounted to a larger structure. The support plates 402 and 408 and the supports 404 and 406 may be made of insulating materials such as ceramics or plastics, although the use of metals is not precluded.

While the battery 100 is fixed or secured in the support unit 400, a cutting unit 410 (e.g., a grinder or other device capable of cutting metal or cutting the enclosure 102) is used to make cuts 412 in the at least the enclosure 102 of the battery 100. In some embodiments, both the cover 104 and the enclosure 102 are cut. The cuts 412 are typically made vertically along a length of the battery 100 extending from a top of the enclosure 102 or a top of the cover 104 to a bottom of the enclosure 102. Alternatively, the cuts 412 may be made in another direction.

When cutting or forming the cuts 412, a coolant may also be used. When cutting, an edge or blade of the cutting unit 410 is usually kept from penetrating inside the enclosure 102. Thus, the cutting unit 410 does not cut completely through the body 118 of the enclosure 102. Rather, a certain thickness of the body 118 remains. By way of example only and not limitation, the remaining thickness of the body 118 at the cuts 412 is on the order of 0.1 to 3.0 microns.

Figure 5:
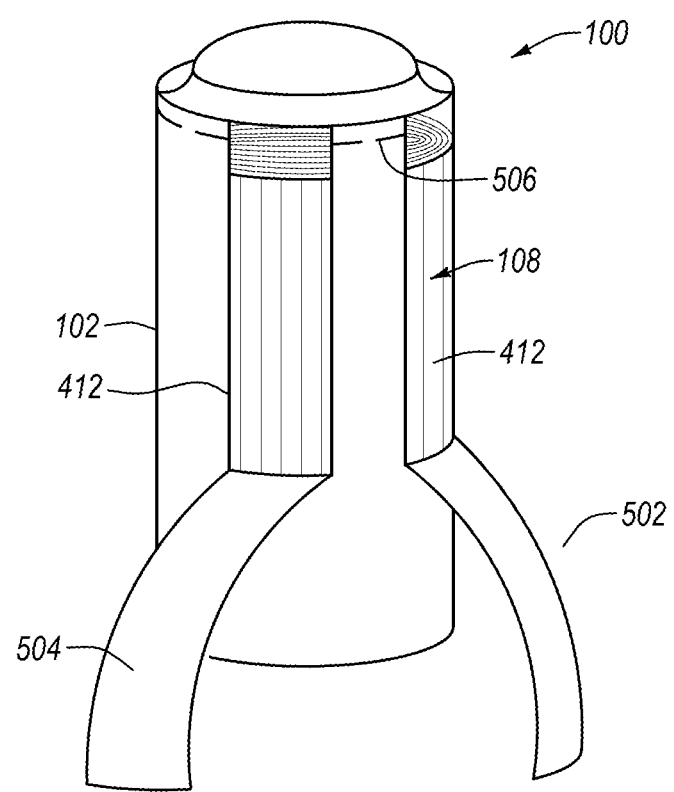
FIG. 5 shows an illustrative example of a battery during disassembly.

FIG. 5 shows an illustrative example of the battery 100 during disassembly. After the cuts 412 are formed, the enclosure 102 can be reconfigured or manipulated such that the core 108 can be removed. For example, strips 502 and 504 formed in the enclosure 102 by the cuts 412 can be peeled back to expose the core 108. As previously stated, the thickness of the enclosure 102 remaining at the cuts 412 enables the strips 502 and 504 to be manipulated.

In this example, the cuts 412 define the strips 502 and 504 (representing all of the strips defined by the cuts 412) and the strips 502 and 504 can be peeled back to expose the core 108. The cuts 412 create weak spots in the enclosure 102 and/or the cover 104 enabling the strips 502 and 504 to be peeled back from the core 108. Once the strips 502 and 504 are peeled or bent back, the core 108 can be removed or extracted from inside the battery. Typically, the number of cuts formed in the enclosure 102 can be between 2 and 20 or between 4 and 18 or between 6 and 12, by way of example only. The number of cuts 412 may also be dependent on a size of the battery 100. In some embodiments, a horizontal cut 506 can also be made near the top of the enclosure 102 to facilitate peeling the strips 502 and 504.

When the strips 502 and 504 are being manipulated, for example, a machine may grasp the cover 104 or a top of the strips 502 and 504 and pull to peel each strip. Once the positive contact wire 114 is exposed (see FIG. 1), the positive contact wire 114 is cut. When the negative contact wire 116 is exposed, the negative contact wire 116 is also cut. The core 108 can then be removed. With the core 108 removed, the core 108 as well as the enclosure 102 can be recycled.

Figure 6:
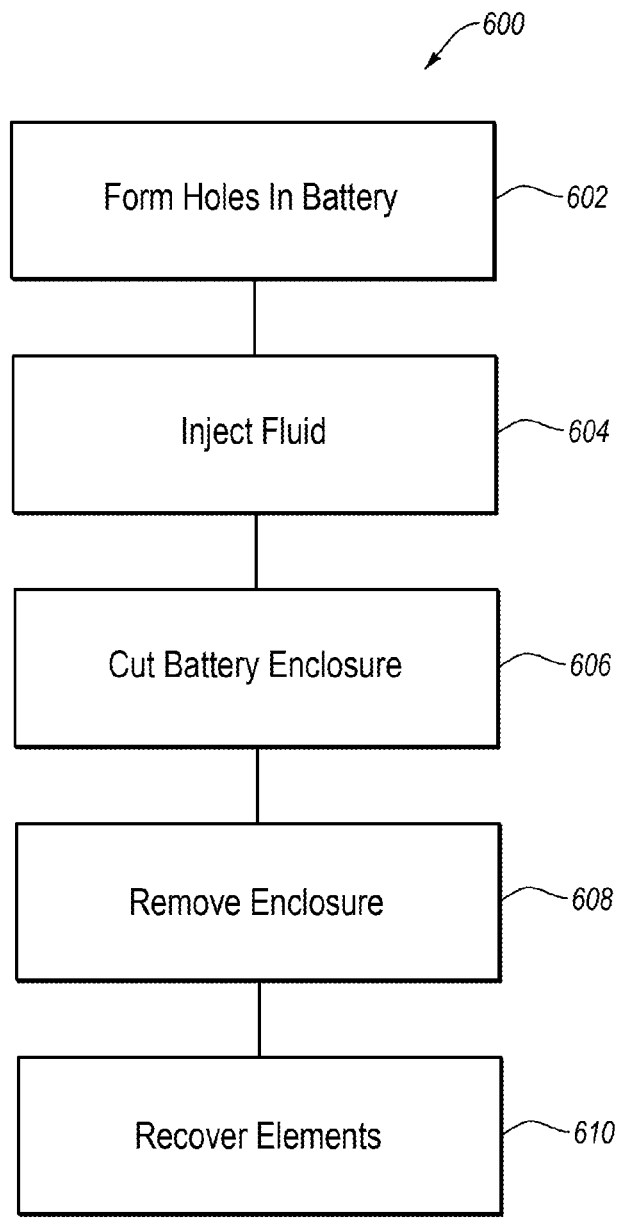
FIG. 6 shows an illustrative method for disassembling a battery.

FIG. 6 shows an illustrative method for disassembling a battery. In block 602, holes are formed in a battery. As previously mentioned, the holes are typically formed or aligned with the clearance in the battery such that, in one example, the core or the electrodes are not pierced where possible. The size of the holes formed in the battery is typically dependent on the size of the clearance and/or the size of the battery. The holes may be formed by drilling, for example. In addition, cooling may be provided while forming the holes.

Forming the holes in the battery may be preceded by fixing the battery in a support unit, although this may occur at any point in the process.

In block 604, fluid is injected into at least one of the formed holes to make the electrolyte non-volatile and/or to solidify the electrolyte. The volume of fluid injected, the types of liquids injected, and/or the time that the liquid is injected can vary. For example, injecting fluid into at least one of the holes can include injecting cyanoacrylate and then injecting water. Alternatively, the injection of cyanoacrylate may be preceded by an injection of water.

The injection volume of each fluid or of all fluids collectively can vary between 10 mL and 30 mL. The injection time of each fluid or of all fluids collectively may be between 1 and 30 seconds. However, these ranges are by way of example only and other volumes and/or times can be selected. In some instances, differently sized batteries may require different volumes and/or times of injection.

Injecting the fluid may also include suctioning the injected fluid from the battery. The injection and suction operations can be repeated any number of times. The injection and suction operations can also be performed at the same time. For instance, the fluid may be injected into one of the holes and suctioned out of the other hole.

At the same time, the battery may be treated in an ultrasonication or ultrasonic bath for easier diffusion of the injected fluid. The ultrasonic bath uses sound waves to generate alternating high-pressure and low-pressure waves inside the battery and more specifically in the injected fluid and/or the electrolyte inside the battery. These waves lead to cavitation in the fluids inside the battery. The cavitation allows the injected fluid to mix with the electrolyte more quickly and, in some instances, more thoroughly. The ultrasonic bath may reduce the amount of injected fluid required as well as the time required to solidify the electrolyte.

In one example, the fluid inside of the battery can be suctioned out during a vacuuming process. The fluid suctioned or extracted from the battery can be trapped in a vessel, for instance, placed between the battery and a vacuum pump. The extracted fluid may be stored and then recycled. When the extracted fluid is recycled, a centrifugal machine and/or a filtering machine can be used to separate the fluid from any solid that may have been suctioned out of the battery. Next, the remaining fluid can be distilled to separate out any solids. In one example, the distilling process can occur without a moister atmosphere to purify the liquid. The distilling process could also be performed under conditions of reduced pressure.

After the fluid has been injected and the electrolyte is at least partially solidified or non-volatile, the enclosure of the battery is cut in block 606. In one example, the cover and/or the enclosure are cut. While cutting the cover and/or the enclosure, the cutter does not penetrate the enclosure, particularly in the area of the enclosure adjacent the core. However, the cutter may penetrate through the cover and/or through a portion of the enclosure in some embodiments. For example, the cutter may completely penetrate the body of the battery at the cover or in the portion corresponding to the clearance within the battery. When cutting the enclosure, the cuts are formed to define strips. The strips can be formed vertically, spirally, or the like.

In block 608, the enclosure is removed or manipulated to expose the core. Removing the enclosure can include peeling back at least some of the strips defined in the enclosure and/or in the cover. Once the positive electrode wire is sufficiently exposed, it is cut. The strips or a number of the strips are bent or moved away from the core. After the negative electrode wire is exposed and cut and a sufficient number of strips are moved or peeled, the core can be removed from the battery.

At this point, the disassembly of the battery is complete. However, some embodiments of the method also include, in block 610, recovering the elements of the battery. This may include melting the core for recycling, performing acid dissolution to recover elements such as lithium and cobalt from the positive electrode, condensing the electrolyte to recover lithium, and the like.

More generally, the core (e.g., the wound sheet) is disassembled to separate the electrodes. Cobalt, manganese, nickel, aluminum, and lithium are recovered from the positive electrode. Lithium, phosphorus, boron, and fluorine may be recovered from the electrolyte. Copper from the negative electrode may be recycled and the carbon negative electrode material can be burnt as fuel. The body of the enclosure can also be melted and recycled.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 7:
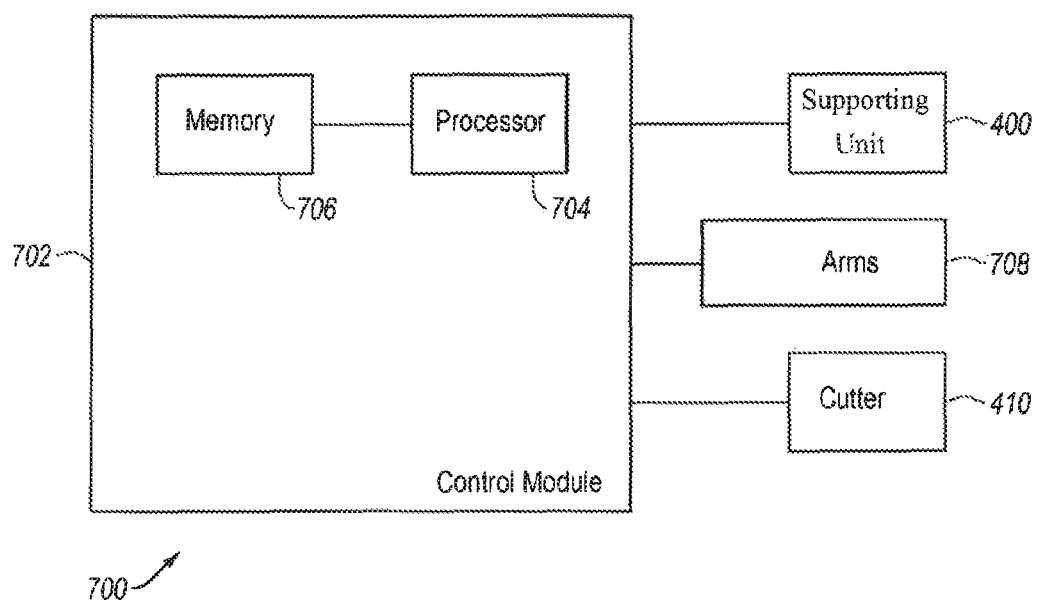
FIG. 7 shows an illustrative example of a system for disassembling a battery.

FIG. 7 shows an illustrative example of a system 700 for disassembling a battery. FIG. 7 illustrates that the components for disassembling the battery 100 can be controlled automatically. A control module 702 may use a processor 704 to execute instructions stored in a memory 706. The control module 702 is operably connected with the support unit 400, the cutting unit 410, and arms 708. The control module 702 is able to manipulate at least one of the support unit 400 and the cutting unit 410 such that the cuts 412 can be formed in the battery held in the support unit 400. Often, a width of the support unit 400 is sufficiently thin such that all necessary cuts can be formed in the battery without having to reorient the battery in the support unit 400.

The control module 702 may also be able to control arms 708. The arms 708 may be configured to peel the strips defined by the cuts, cut the contact wires, and extract the core from within the battery. The arms 708 can then deposit the core in an appropriate place for recycling. FIG. 7 illustrates that the disassembly process can be substantially automated.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium or controlled by the computer-readable instructions. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely exemplary, and that, in fact, many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A system configured to disassemble a battery, the system comprising:
a support unit configured to support the battery during disassembly of the battery;
a drill component configured to form at least one hole in the battery;
an injection module configured to inject a fluid through the at least one hole, the fluid is configured to inactivate an electrolyte included in a core of the battery disposed inside an enclosure of the battery; and
a cutting unit configured to cut an outer surface of the enclosure to produce cuts in the enclosure, the cuts are configured to enable manipulation of the enclosure to remove the core of the battery from the enclosure.

2. The system of claim 1, wherein the support unit comprises insulating material or metal.

3. The system of claim 1, wherein the support unit comprises at least one pressing member configured to maintain the battery in a fixed position.

4. The system of claim 1, wherein the drill component is configured to drill the at least one hole in the battery between the enclosure and a cover of the battery.

5. The system of claim 1, wherein the cutting unit is configured to cut the outer surface of the enclosure in at least one of a vertical manner and a spiral manner.

6. The system of claim 1, further comprising a control module configured to automatically control the drill component, the injection module, and the cutting unit.

7. The system of claim 1, wherein the cutting unit is configured to cut through the outer surface of the enclosure to a depth that does not completely penetrate through the enclosure.

8. The system of claim 1, wherein the drill component is configured to drill the at least one hole into the enclosure at a clearance above the core.

9. The system of claim 1, wherein the injection module is configured to inject a cooling second fluid into the at least one hole to transfer heat out of battery that is generated by inactivation of the electrolyte.

10. The system of claim 1, wherein the fluid includes a first fluid and a second fluid.

11. The system of claim 10, wherein the injection module is configured to inject the first fluid and the second fluid simultaneously.

12. The system of claim 10, wherein the injection module is configured to inject the first fluid and the second fluid sequentially.

13. The system of claim 1, further comprising an arm configured to peel one or more strips defined by cuts made in the enclosure by the cutting unit to expose the core.

14. The system of claim 1, further comprising an arm configured to disconnect at least one of a positive electrode contact of the battery and a negative electrode contact of the battery.

15. The system of claim 1, wherein the battery is a lithium-ion battery.

* * * * *